US011425226B2

United States Patent
Appel et al.

(10) Patent No.: US 11,425,226 B2
(45) Date of Patent: Aug. 23, 2022

(54) PLATFORM AGNOSTIC PEER-TO-PEER NETWORKING APPROACH FOR UTILIZING MULTIPLE USER DEVICES WITH A DIGITAL PLATFORM

(71) Applicant: Disney Enterprises, Inc., Burbank, CA (US)

(72) Inventors: Eric Appel, New York, NY (US); Gary Kagan, New York, NY (US); Joshua Phelps, New York, NY (US); Benjamin Manning, New York, NY (US); James Corrigan-Colville, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/994,222

(22) Filed: Aug. 14, 2020

(65) Prior Publication Data

US 2022/0053073 A1  Feb. 17, 2022

(51) Int. Cl.
*H04L 69/165* (2022.01)
*H04W 80/12* (2009.01)
*H04N 21/414* (2011.01)
*H04N 21/258* (2011.01)

(52) U.S. Cl.
CPC ..... *H04L 69/165* (2013.01); *H04N 21/25816* (2013.01); *H04N 21/41407* (2013.01); *H04W 80/12* (2013.01)

(58) Field of Classification Search
CPC ............ H04L 69/165; H04N 21/25816; H04N 21/41407; H04W 80/12
See application file for complete search history.

(56) References Cited

U.S. PATENT DOCUMENTS

| 2015/0135214 A1* | 5/2015 | Reisman | H04N 21/4113 725/37 |
| 2015/0271557 A1* | 9/2015 | Tabe | H04N 21/6131 725/14 |

\* cited by examiner

*Primary Examiner* — Kristie D Shingles
(74) *Attorney, Agent, or Firm* — Patterson + Sheridan, LLP (57) ABSTRACT

The exemplary embodiments relate to improving the user experience associated with a digital platform. A first user device configured to remotely access a digital platform may receive a first signal broadcast by a second user device. Two or more types of communication protocols that are available to use for establishing a direct communication channel between the user devices are identified. One of the communication protocols is selected and a communication channel is established between the user devices in accordance with the selected communication protocol. The first user device then receives authentication information from the second user and establishes a session with the digital platform based on the authentication information received from the second user device.

18 Claims, 4 Drawing Sheets

PLATFORM AGNOSTIC PEER-TO-PEER NETWORKING APPROACH FOR UTILIZING MULTIPLE USER DEVICES WITH A DIGITAL PLATFORM

BACKGROUND INFORMATION

A user may subscribe to a digital platform that provides any of a variety of different services (e.g., streaming video, digital media, news, e-commerce, etc.). On the user side, various different types of electronic devices may be used to access the digital platform. For example, devices such as, but not limited to, mobile devices, desktop computers, connected televisions (TVs) or tablets may be configured to access the digital platform via a user-facing application or a web browser.

The user experience associated with the digital platform may depend on the device that is used to access the digital platform. For instance, consider a scenario in which the user has a mobile device and a connected TV. Between these two devices, the connected TV may provide a richer viewing experience. However, the hardware and user interface of the connected TV may cause friction that dissuades the user from accessing the digital platform on the connected TV. As a result, the user may prefer to access the digital platform on their mobile device and may avoid accessing the digital platform on their connected TV despite the connected TV being capable of providing a richer viewing experience.

The digital platform may support the use of multiple devices on the user side. For example, to access the digital platform on the connected TV, the user may be prompted to input a code at a website that is to be accessed by the user on a different device (e.g., the mobile phone, a desktop computer). Subsequently, the user may be able to interact with the digital platform via the user-facing application of the connected TV. These types of conventional procedures and the connected TV's lack of a conventional physical keyboard are some of the causes of friction that may dissuade users from accessing and interacting with the digital platform on their connected TV.

The above example described using multiple devices in the context of accessing the digital platform. However, multiple devices may also be used to enhance the user experience associated with interacting with the digital platform. For example, the digital platform may provide streaming video content to the user's connected TV. To enhance the presentation of the streaming video content, additional content associated with the streaming video may be accessed on the mobile device. However, as indicated above, the friction associated with accessing the digital platform on certain devices (e.g., the connected TV) may dissuade the user from configuring an arrangement of devices that is capable of providing these types of enhancements.

From the perspective of the digital platform, another obstacle to the use of multiple devices on the user side is incompatible computing platforms. For instance, the user may be equipped with a connected TV and a mobile device. The connected TV may be running on a computing platform corresponding to a first developer and the mobile device may be running a computing platform corresponding to a second different developer. Generally, computing platforms corresponding to different developers are incompatible with one another. Consequently, under conventional circumstances, if a user is equipped with multiple devices that are running on incompatible computing platforms, the user may be unable to access the digital platform using techniques that involve multiple devices and unable to use second screen enhancements that are offered by the digital platform. Thus, incompatible computing platforms are another obstacle to the use of multiple devices on the user side.

As described above, there are various ways in which conventional methods attempt to incorporate multiple devices on the user side to improve or enhance the user experience associated with the digital platform. However, these conventional methods either rely on devices like the connected TV which are inherently frustrating to use, procedures that introduce friction into the user experience or a set of devices that are each running on the same computing platform. Thus, despite being equipped with multiple devices that are each individually capable of accessing the digital platform, users may be unwilling or unable to use their multiple devices. Accordingly, there is a need for a convenient and computing platform agnostic approach to access and interact with the digital platform using multiple devices.

DETAILED DESCRIPTION

The exemplary embodiments may be further understood with reference to the following description and the related appended drawings, wherein like elements are provided with the same reference numerals. The exemplary embodiments relate to improving the user experience associated with a digital platform. In a first aspect, the exemplary embodiments relate to creating a communication channel between two or more devices using a computing platform agnostic approach. In a second aspect, the exemplary embodiments relate to the various ways in which the connected devices may improve the experience associated with accessing and interacting with the digital platform.

The exemplary embodiments are described with regard to a user device. Throughout this description, the term "user device" generally refers to any electronic component that is configured with the hardware, software, and firmware to exchange data with a network. Various examples may be described with regard to a mobile device and a connected television (TV). However, reference to these types of user devices is merely provided for illustrative purposes and is not intended to limit the exemplary embodiments in any way. Therefore, the user device as described herein is used to represent any suitable electronic device and any reference to a user device being a particular type of user device is merely provided for illustrative purposes.

The exemplary embodiments are also described with regard to a digital platform running on one or more servers. Throughout this description, the term "digital platform" generally refers to software that is configured to provide a digital environment that may be accessed and interacted with remotely by a user device. The digital platform may be configured to provide any of a variety of different services including, but not limited to, streaming video, streaming audio, digital media, news, e-commerce, etc. However, reference to the term digital platform is merely provided for illustrative purposes, different entities may refer to a similar concept by a different name. Further, any reference to the digital platform being configured to provide a particular functionality or a particular hardware component being utilized to execute an aspect of the digital platform is also only provided for illustrative purposes. The exemplary embodiments may apply to a digital platform that is configured for any type of functionality and runs on any appropriate set of electronic components, including cloud implementations.

The exemplary embodiments are further described with regard to a user remotely accessing the digital platform via a web browser or a user-facing application running on a user device (e.g., a mobile device, a desktop computer, a connected TV, a wearable, a digital media receiver, a set top box, etc.). Throughout this description the terms "subscriber" and "user" may be used interchangeably and are intended to represent a person who accesses the digital platform on a user device via a network connection. However, reference to a user accessing the digital platform via a web browser or a user-facing application is only provided for illustrative purposes. The exemplary embodiments may apply to the user accessing the digital platform in any appropriate manner.

In a first aspect, the exemplary embodiments relate to implementing a mechanism for creating a communication channel between two or more user devices using a peer-to-peer networking approach. The exchange of information between the two or more user devices and the digital platform that is facilitated by this communication channel may enable a wide variety of functionalities that improves the user experience associated with the digital platform. For instance, as mentioned above, certain types of user devices (e.g., connected TVs) may provide a richer viewing experience. However, under conventional circumstances, accessing the digital platform on these types of devices may be inconvenient and deter users from accessing the digital platform on these types of devices. As will be described in more detail below, the exemplary communication channel may reduce friction and improve the user experience associated with accessing the digital platform on devices that are inherently frustrating to use under conventional circumstances. This is just one example of the various different types of functionalities that may be enabled by this exemplary mechanism.

As indicated above, one obstacle to the use of multiple user devices on the user side is incompatible computing platforms. Throughout this description, the term "computing platform" generally refers to a set of hardware, software and firmware that facilitates the execution of code at the user device. A computing platform may be characterized by the entity, manufacturer or developer that produced the computing platform or the corresponding user device. However, reference to the term computing platform is merely provided for illustrative purposes, different entities may refer to a similar concept by a different name.

Generally, different computing platforms may not be compatible with one another. For instance, a user device running on a particular computing platform may be configured to communicate over the air with other user devices running on the same (or similar computing platform) by using a computing platform specific communication protocol. For example, an entity may implement one or more proprietary protocol stacks that enables wireless communication between devices running the entity's software. However, a user device running on a first type of computing platform may not be configured to use a computing platform specific communication protocol corresponding to a second different computing platform. Consequently, under conventional circumstances, user devices running on distinct computing platforms may prevent subscribers from taking advantages of certain features provided by the digital platform that relies on communication between two or more user devices.

As will be described in more detail below, the exemplary embodiments are compatible with multiple standards based and computing platform specific communication protocols. Since the exemplary mechanism is compatible with multiple distinct communication protocols, the exemplary embodiments are able to handle real world networking scenarios that may prevent any single peer-to-peer technique from working (e.g., incompatible computing platforms).

To provide a general example of the exemplary mechanism, consider a scenario in which a user has two user devices. Initially, the user opens the user-facing application on a first user device. This may trigger the first user device to perform an advertising procedure for indicating a device's availability. The advertising procedure may include at least of one performing a broadcast and listening for a broadcast. The broadcast may indicate that the first user device is configured to access the digital platform and is looking to establish a communication channel with another user device configured to access the same digital platform (e.g., the second user device or any other user device). The listening may include monitoring for an indication that the second user device or any other user device is looking to establish a communication channel with another user device configured to access the same digital platform (e.g., the first user device). Thus, from the perspective of the first user device, the advertising procedure may include both listening for pairing availability and advertising pairing availability.

Once the first user device and the second user device are aware of one another, further signaling may be performed to establish a persistent communication channel. The persistent communication channel may be based on any of a variety of different standards based or computing platform specific communication protocols. Thus, unlike conventional mechanisms, the exemplary embodiments utilize a computing platform agnostic peer-to-peer networking approach to establish a communication channel between two or more user devices configured to access the same digital platform.

There are various ways in which the exemplary mechanism may establish a communication channel between user devices. The above example is not intended to limit the exemplary embodiments in any way. Instead, the above example is intended to provide a general example of an exemplary computing platform agnostic approach for establishing a communication channel between two user devices each configured to access the same digital platform.

In a second aspect, the exemplary embodiments relate to the various ways in which the connected user devices may improve the user experience associated with accessing and interacting with the digital platform. In one example, the communication channel may enable two or more user devices to share a login session with the digital platform. Thus, a subscriber's credentials may only need to be input or saved on one of the user devices for the two or more user devices to access the digital platform. This example was eluded to above when discussing the inherently frustrating constraints of the connected TV that cause friction (e.g., inconvenient user interface, lack of physical keyboard, the conventional procedures mentioned above, etc.) during the login process.

In another example, the communication channel may enable a user to grant guest access to the digital platform to a non-subscriber. For example, a user may be subscribed to the digital platform and equipped with their mobile device. The user may be located at another user's house who is not subscribed to the digital platform. The subscribed user wants to access the digital platform on the non-subscribed user's connected TV. Using the exemplary computing platform agnostic approach, the subscribed user may connect their mobile device to the non-subscribed user's connected TV. When connected, the subscribed user may grant temporary guest access to the non-subscribed user's connected TV. Thus, a subscriber may allow a non-subscriber to temporarily access various aspects of the digital platform. Not only does this improve the subscriber's user experience with the digital platform, it also provides the digital platform an opportunity to convert the non-subscriber to a subscriber.

In a further example, the communication channel may enable a second screen experience. For example, the user may configure the connected TV to display streaming video of a sporting event. Additional content associated with the sporting event may be provided to the mobile device by the digital platform via the communication channel with the connected TV. As will be described in more detail below, there are various ways in which the communication channel and the second screen (e.g., the mobile device) may be utilized to enhance the user experience associated with the digital platform.

The above described examples are not intended to limit the exemplary embodiments in any way. Instead, the above examples are only intended to provide a general overview of the type of functionality that may be enabled by establishing a communication channel using the exemplary computing platform agnostic peer-to-peer networking approach described herein. As will be described in more detail below, there are various different types of functionality associated with accessing and interacting with the digital platform that may be enabled by establishing a communication channel between two or more user devices using the exemplary computing platform agnostic peer-to-peer networking approach described herein.

From the perspective of the digital platform, under conventional circumstances, various aspects of the user experience cannot be controlled by the digital platform. The user experience is an important factor in both subscriber retention and subscriber conversion. Thus, aspects that are outside of the control of the digital platform may affect the digital platforms revenue generating abilities. To provide an example, the digital platform cannot control the friction caused by a connected TV's lack of physical keyboard or frustrating user interface. Similarly, the digital platform cannot control whether user devices are running on compatible computing platforms. The exemplary computing platform agnostic peer-to-peer network approach allows the digital platform to overcome obstacles that may, under conventional circumstances, deter users from utilizing the full scope of functionality that the digital platform is capable of providing. This improves the user experience associated with the digital platform and thus, may also improve subscriber retention/conversion.

Figure 1:
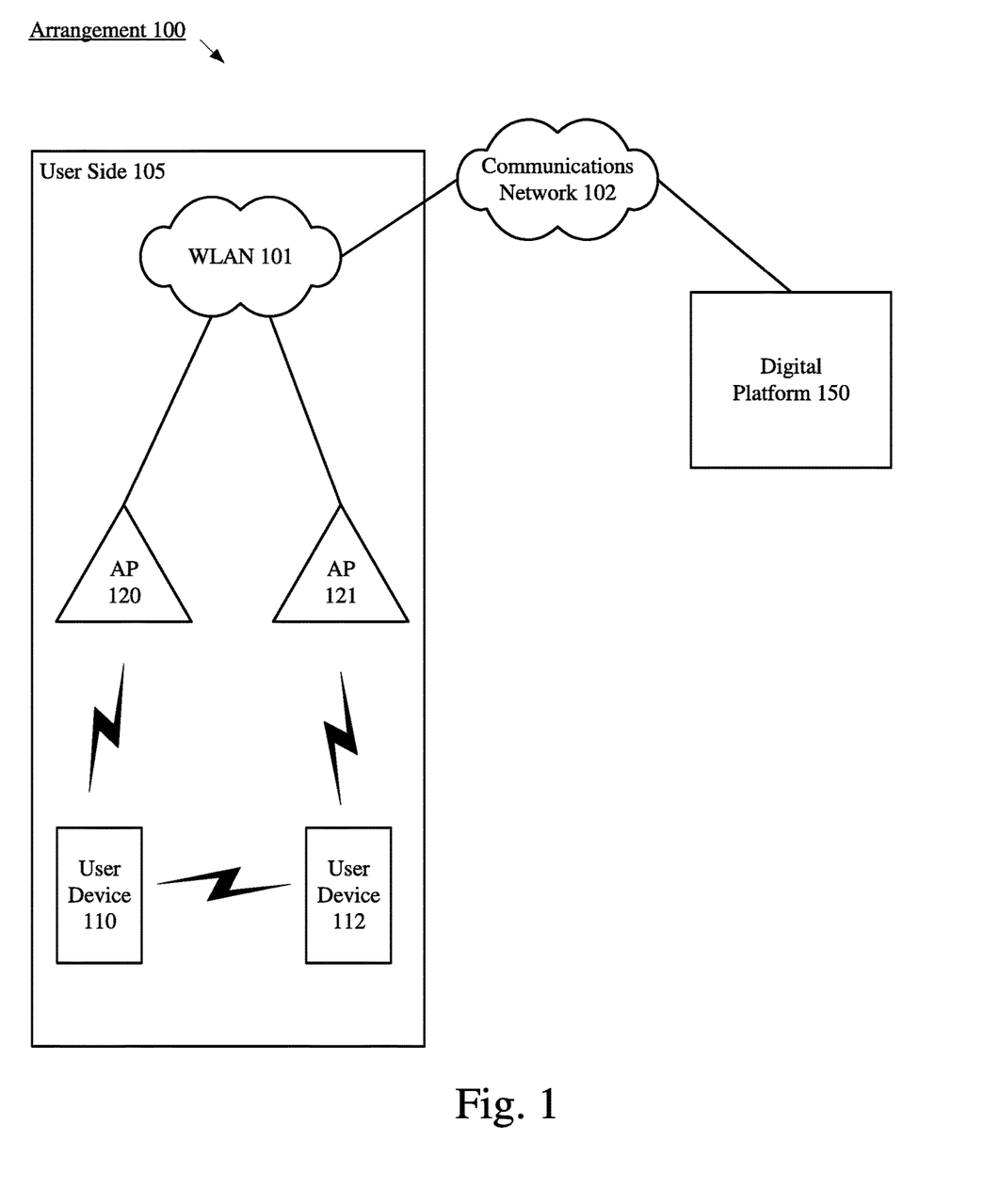
FIG. 1 shows an exemplary arrangement according to various exemplary embodiments.

FIG. 1 shows an exemplary arrangement 100 according to various exemplary embodiments. The arrangement 100 includes a wireless local area network (WLAN) 101, a communications network 102, a user side 105 and a digital platform side 150.

The user side 105 includes a first user device 110, a second user device 112, a first access point (AP) 120 and a second AP 121. In this example, the first user device 110 may represent a connected TV and the second user device 112 may represent a mobile device. As mentioned above, the exemplary embodiments are not limited to arrangements that include a connected TV and a mobile device. For example, instead of a connected TV, the first user device 110 may be a streaming device connected to a regular TV or other type of display device. Throughout this description, the user devices 110, 112 are not limited to any particular type of device and may represent any type of electronic component that is configured to receive data via a network connection, e.g., a desktop computer, a laptop computer, a mobile phone, a tablet computer, a smartphone, a phablet, a wearable device, an Internet of Things (IoT) device, a set-top box, a connected TV, a multimedia receiver, a network appliance, an entertainment device, a streaming media player, a digital media receiver, a streaming device, etc. Accordingly, the user devices 110, 112 may represent any suitable electronic device.

Throughout this description, some embodiments may be described with regard to a single user corresponding to both user devices 110, 112. Other embodiments may be described with regard to a first user corresponding to one of the user devices 110, 112 and a second user corresponding to the other one of the user devices 110, 112. However, the exemplary embodiments are not limited these scenarios, an actual arrangement may include any number of user devices corresponding to any number of users.

On the user side 105, the APs 120, 121 may provide access to the WLAN 101. The user devices 110, 112 may communicate with one another via the WLAN 101 and may also achieve Internet connectivity indirectly via the WLAN 101. Throughout this description, the term "WLAN" may represent any type of wireless local area network (WiFi, Hot Spot, IEEE 802.11x networks, etc.) and the term "AP" may represent any device configured to provide access to the corresponding WLAN. For example, an AP may have a wired connection to a router or hub and project a WiFi signal over a particular coverage area. Those skilled in the art will understand the procedures and protocols that may be implemented to connect to the APs 120, 121 and communicate with other devices via the WLAN 101. In addition, one or more of the user devices 110, 112 may be connected via a wired connection. Thus, the exemplary embodiments are not limited to a WLAN and may apply to a network that is a WLAN, a local area network (LAN) or a combination thereof.

The communications network 102 may represent one or more networks that facilitate communication between the user side 105 and the digital platform 150. On the user side 105, the user devices 110, 112 may indirectly access the communications network 102 via the APs 120, 121 wirelessly or using a wired connection. Thus, the WLAN 101 may provide access to the communications network 102. The digital platform 150 may also connect to the communications network 102 wirelessly or using a wired connection. Those skilled in the art will understand the procedures and protocols that may be implemented for each of the user devices 110, 112 and the digital platform 150 to connect to the communications network 102 and communicate with a remote endpoint via the network connection.

In the example of FIG. 1, the APs 120, 121 are shown as having a wired connection to the communications network 102. The user device 110 is shown as connecting to the communications network 102 indirectly via a wireless connection to the AP 120 and the user device 112 is shown as connecting to the communications network 102 indirectly via a wireless connection to the AP 121. It should be understood that each of these components 110, 112, 120, 121 may connect to the communications network 102 in any appropriate manner. Further, in the example of FIG. 1, the digital platform 150 is shown as having a wired connection to the communications network 102. It should also be understood that the digital platform 150 may connect to the communications network 102 in any appropriate manner. For example, the entity providing the digital platform 150 may have an internal network (e.g., LAN or WLAN) that connects to the public Internet to provide the digital platform with Internet connectivity. Thus, it should be understood that the communications network 102 may represent any manner or type of one or more networks used to connect the various components of the arrangement 100.

The user device 110 and the user device 112 may be configured to directly communicate with one another without using the communications network 102. For example, as indicated above, in some embodiments, the user device 110 and the user device 112 may communicate directly with one another via the WLAN 101. In another example the user devices 110, 112 may communicate with one another using a short-range communication protocol such as BlueTooth. Thus, if the user device 110 and the user device 112 are within a proximity of one another (e.g., within a distance in which BlueTooth communications may be performed), the user device 110 and the user device 112 may exchange data.

As will be described in more detail below, the user devices 110, 112 may use any of a variety of different communication protocols to establish a communication channel that may be used to communicate directly with one another. When connected, the user device 110 and the user device 112 may have a companion relationship where the user device 110 is a source device and the user device 112 is an accessory device or vice versa. Thus, in the scenario where the user device 110 is the source device and the user device 112 is the accessory device the user device 112 may be configured to access services from the digital platform 150 by utilizing the communication channel with the user device 110 without exchanging data with the communications network 102. In this type of configuration, the user device 110 may connect to the communications network 102 and relay data exchanged with the communications network 102 to the user devices 112 over the communication channel. However, in other operating modes, the user devices 110, 112 may connect to the communications network 102 regardless of whether the companion relationship with the other one of the user devices 110, 112 has been established.

In this example, the user device 110 is shown as being connected to the AP 120 and the user device 112 is shown as being connected to the AP 121. However, this is just provided as an example to demonstrate that the user devices 110, 112 may have a companion relationship without being connected to the same AP. For example, in some embodiments, the user device 110 and user device 112 may initially be connected to the same AP (e.g., AP 120 or AP 121). Subsequently, the user devices 110, 112 may form a companion relationship that is to utilize any of a variety of different communication protocols. After the companion relationship is formed, the user devices 110, 112 may then connect to different APs 120, 121 (as shown in FIG. 1.) In this arrangement, the user devices 110, 112 may still communicate directly with one another despite each being connected to a different AP. The above example is not intended to limit the exemplary embodiments in any way. Those skilled in the art will understand that the digital platform 150 may support any number of user devices using any number of APs.

The digital platform 150 may provide any of a variety of different services to remotely connected user devices. For example, the digital platform 150 may provide services such as, but not limited to, streaming video (e.g., linear channel streams, video on demand, live events, etc.), e-commerce, streaming audio (e.g., radio, live events, music on demand, etc.), digital media, news, video games, health and fitness, etc. To remotely access the digital platform 150 and receive these types of services, the user devices 110, 112 may use a user-facing application configured to connect to the digital platform 150, a website accessed via a web browser or any other appropriate mechanism.

The digital platform 150 may utilize various hardware, software and firmware components to provide video streams to connected user devices. For example, the digital platform 150 may be comprised of one or more servers. Each server may include one or more communication interfaces to communicate with remote user devices and other components of the digital platform 150. Further, each server may include a processor configured to perform various operations on behalf of the digital platform 150. However, reference to a processor is merely for illustrative purposes. The operations performed by each server may also be represented as a separate incorporated component of the server or may be a modular component coupled to the server, e.g., an integrated circuit with or without firmware. For example, the integrated circuit may include input circuitry to receive signals and processing circuitry to process the signals and other information. In addition, in some servers, the functionality of the processor is split among two or more processors. In other embodiments, the functionality described for the server may include a cloud implementation. The exemplary embodiments may be implemented in any of these or other configurations of a server.

The digital platform 150 may also include one or more databases that are directly or indirectly accessible by the one or more servers. For example, the digital platform 150 may use a database to store multimedia data that is to be provided to connected user devices and a database for storing account information. These databases may be implemented using hardware, software and firmware of a single device (e.g., server) or multiple devices. The above description of the components used to run the digital platform 150 are not intended to limit the exemplary embodiments in any way. Instead, the above description is only intended to provide a general example of the architecture that may be used to run a digital platform 150.

Figure 2:
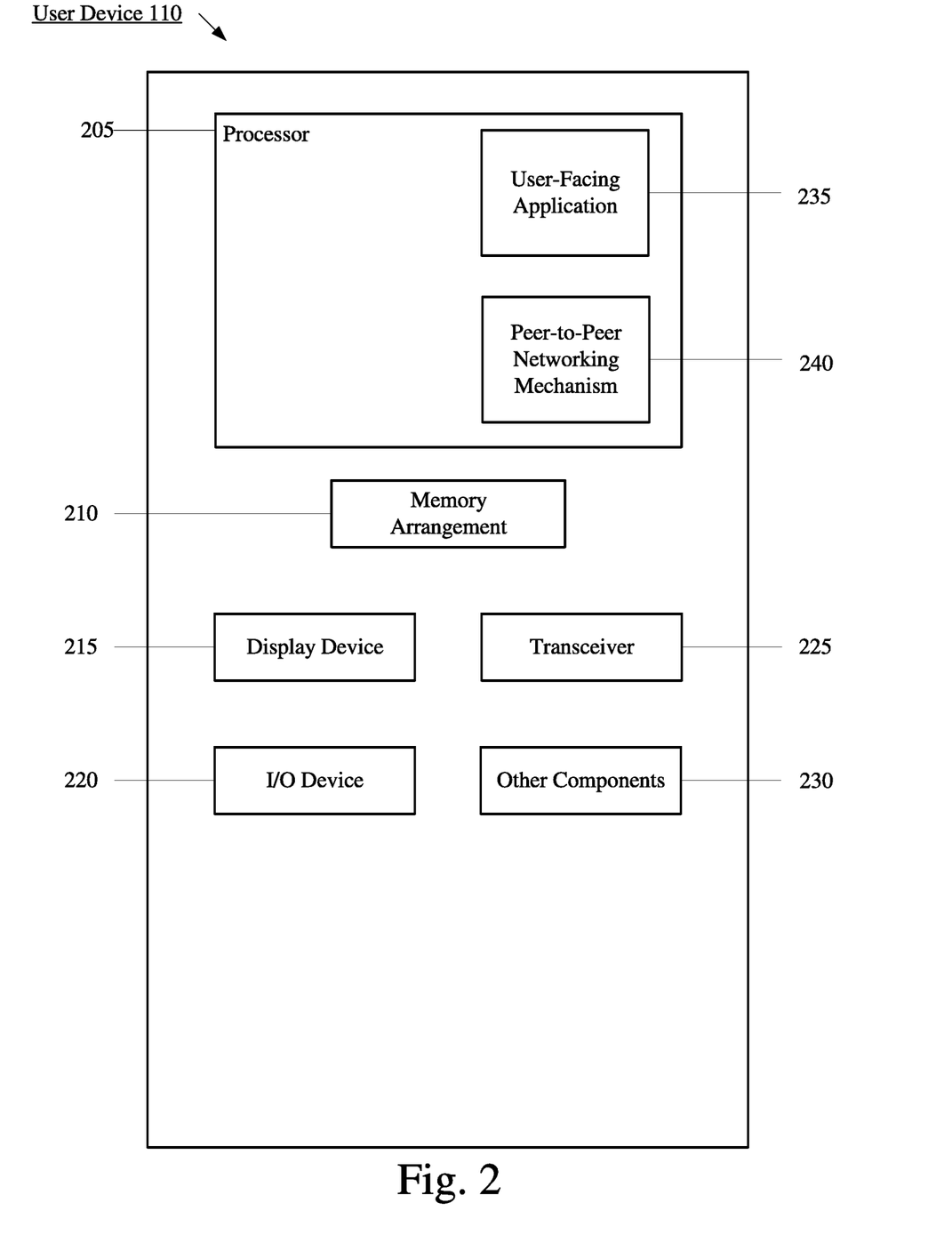
FIG. 2 shows an exemplary user device according to various exemplary embodiments.

FIG. 2 shows an exemplary user device 110 according to various exemplary embodiments. Those skilled in the art will understand that the user device 110 may be any type of electronic component that is configured to execute software or firmware, e.g., a desktop computer, a laptop computer, a mobile phone, a tablet computer, a smartphone, a phablet, a wearable device, an Internet of Things (IoT) device, a set-top box, a connected TV, a multimedia receiver, etc. Accordingly, the user device 110 may represent any electronic device. A person of ordinary skill in the art will understand that the user device 110 may also represent the user device 112.

The user device 110 may include a processor 205, memory arrangement 210, a display device 215, an input/output (I/O) device 220, a transceiver 225, and other components 230. The other components 230 may include, for example, an audio input device, an audio output device, a battery, a data acquisition device, ports to electrically connect the user device 110 to other electronic devices, ports that provide a wired connection to an internet protocol (IP) based network, etc.

The processor 205 may be configured to execute a plurality of applications of the user device 110. For example, the applications may include a user-facing application 235 corresponding to the digital platform 150. The user-facing application 150 may be configured to access the digital platform 150. In some embodiments, the user-facing application 235 may include a peer-to-peer networking mechanism 240. In other embodiments, the peer-to-peer networking mechanism 240 may be a separate piece of software. The peer-to-peer networking mechanism 240 may be configured to identify that a further user device is configured to access the digital platform 150 using an advertising procedure. Specific examples of the advertising procedure will be described in more detail below. The peer-to-peer networking mechanism 240 may then identify that a communication channel may be established with the further user device using one or more different types of communication protocols. Subsequently, the peer-to-peer networking mechanism 240 may select a communication protocol that is to be used to establish the communication channel with the further user device.

The user-facing application 235 and the peer-to-peer networking mechanism 240 being executed by the processor 205 is only exemplary. The functionality associated with the user-facing application 235 and the peer-to-peer networking mechanism 240 may also be represented as separate incorporated components of the user device 110 or may be a modular component coupled to the user device 110, e.g., an integrated circuit with or without firmware. For example, the integrated circuit may include input circuitry to receive signals and processing circuitry to process the signals and other information. In addition, in some user devices, the functionality described for the processor 205 is split among two or more processors. The exemplary embodiments may be implemented in any of these or other configurations of a user device.

The memory arrangement 210 may be a hardware component configured to store data related to operations performed by the user device 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to communicate with the AP 120, the communications network 102, other user devices, a WLAN, a cellular network, etc. Accordingly, the transceiver 225 may operate on a variety of different frequencies or channels (e.g., set of consecutive frequencies). The transceiver 225 may also comprise an interface for wires connections.

Figure 3:
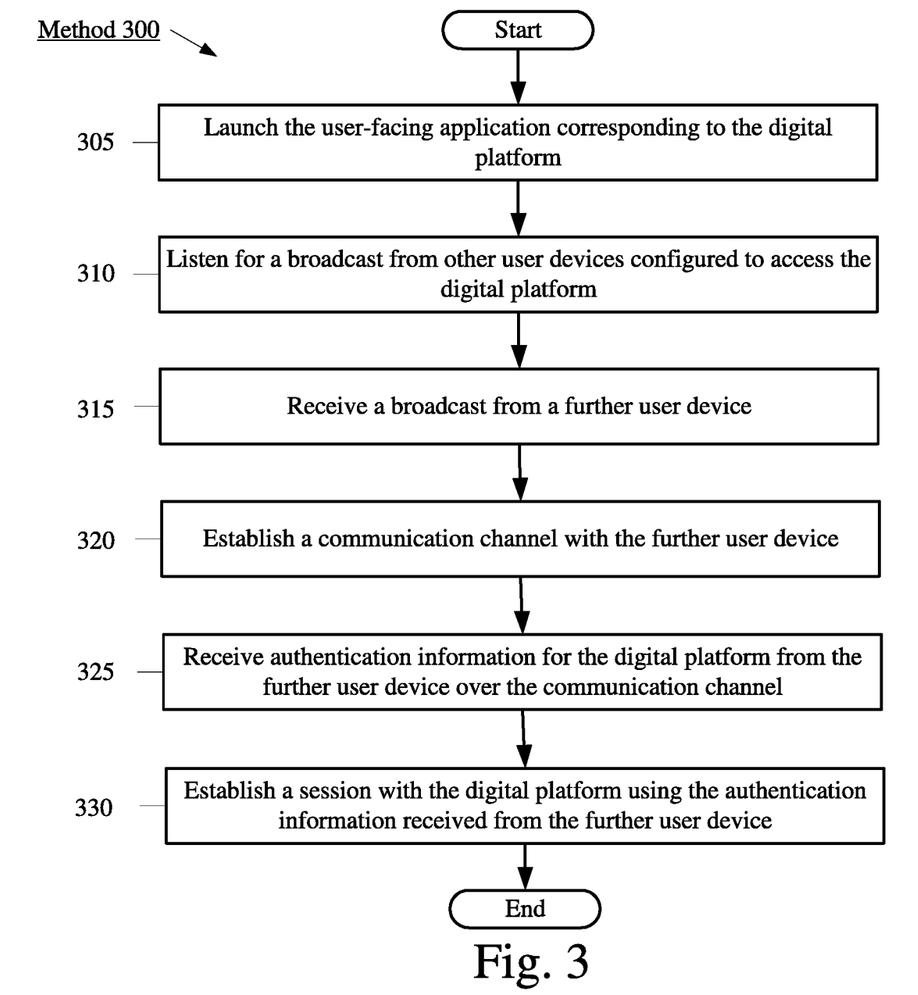
FIG. 3 shows an exemplary method for establishing a communication channel between a first user device and a second user device using a platform agnostic peer-to-peer networking approach according to various exemplary embodiments.
Figure 4:
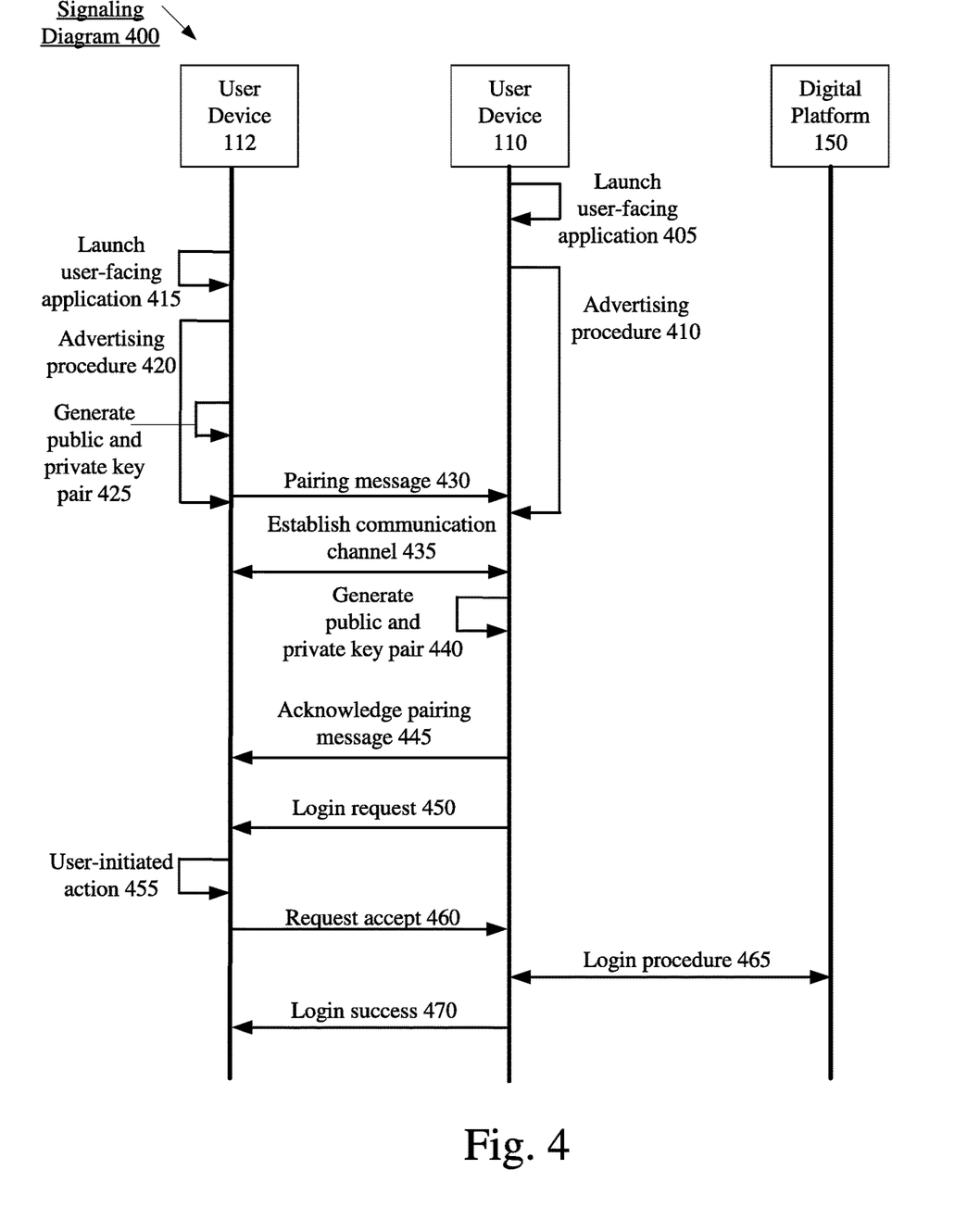
FIG. 4 shows an exemplary signaling diagram for establishing a communication channel between a first user device and a second user device using a computing platform agnostic peer-to-peer networking approach according to various exemplary embodiments.

As will be described in more detail below, the exemplary computing platform agnostic approach relates to having the option to utilize a wide variety of different combinations of communication protocols. As a result, the computing platform agnostic approach is able to overcome the obstacle of incompatible computing platforms in a peer-to-peer networking scenario. FIG. 3 relates to a method 300 for a computing platform agnostic approach to establishing a communication channel between user devices. The method 300 is only intended to provide a general overview of this exemplary approach from the perspective of one of the user devices. FIG. 4 describes a signaling diagram 400 that will provide more details of this exemplary approach from the perspective of both of the user devices.

FIG. 3 shows an exemplary method 300 for establishing a communication channel between a first user device 110 and a second user device 112 using a computing platform agnostic peer-to-peer networking approach according to various exemplary embodiments. The method 300 will be described with regard to the arrangement 100 of FIG. 1 and the user device 110 of FIG. 2.

In this example, the user device 110 represents a connected TV and the user device 112 represents a mobile device. However, those skilled in the art will understand that the exemplary embodiments would also apply to the user device 110 representing the mobile device (or any other appropriate type of user device) and the user device 112 representing the connected TV (or any other appropriate type of user device).

Each user device is configured to access the digital platform 150 using a user-facing application. As indicated above, one of the benefits of the exemplary embodiments is a low friction method of accessing the digital platform 150 from a user device. While the method 300 is not limited to any particular example or any particular set of user devices, the method 300 will be described from the perspective of the connected TV (e.g., the user device 110) to demonstrate how the exemplary embodiments may reduce friction and improve the user experience associated with accessing/interacting with the digital platform 150 on a device, such as the connected TV, that may be inherently frustrating to use under conventional circumstances.

In 305, the user device 110 launches the user-facing application 235. For example, a user-initiated action at the user device 110 (e.g., selection of an icon), may initiate the launch of the user-facing application 235. Prior to establishing a session with the digital platform 150, credentials (e.g., username and password) or any other type of authentication information may be provided to the digital platform 150 at a further user device, such as the user device 112, which may be a mobile device of the user. This ensures that the account, user or user device is permitted to access the digital platform 150 (e.g., is an active subscriber). As indicated above, one of the issues with conventional login procedures is the difficulty to navigate and input information into the connected TV. Thus, in this example, the launch of the user-facing application 235 does not establish a session with the digital platform for the user device 110. As will be described below, user-initiated action at the mobile device (e.g., the user device 112) may trigger a session to be established with the digital platform 150 at the connected TV.

In 310, the user device 110 listens for a broadcast from other user devices configured to access the digital platform. For example, in response to launch of the user-facing application 235, the user device 110 may tune its transceiver 225 to various frequencies to listen for signals broadcast by other user devices. The method 300 will be described with regard to this broadcast being in accordance with a user datagram protocol (UDP). Thus, in this example, the user device 110 is listening for a broadcast from another user device that is configured to access the digital platform 150. The type of signaling and communication protocols that may be used for this broadcast will be described in more detail below with regard to the signaling diagram 400 of FIG. 4.

Returning to the method 300, in 315, the user device 110 receives a broadcast from a further user device (e.g., the user device 112). As indicated above, the broadcast may be in accordance with UDP and may indicate to the user device 110 that i) the user device 112 is configured to access the digital platform 150 and ii) the user device 112 is available for pairing. From the perspective of the user device 112, this broadcast may be triggered by accessing the digital platform 150 at the user device 112. More details from the perspective of the user device 112 will be provided below with regard to the signaling diagram 400 of FIG. 4.

In 320, the user device 110 and the user device 112 may establish a device-to-device (D2D) communication channel. The method 300 will be described with regard to D2D communication channel being a persistent connection in accordance with the transport control protocol (TCP). Thus, in this example, signaling for pairing occurs in accordance with a first communication protocol (e.g., UDP) and signaling over the persistent communication channel occurs in accordance with second different communication protocol (e.g., TCP). The type of signaling and communication protocols that may be used for exchanging information over this communication channel will be described in more detail below with regard to the signaling diagram 400 of FIG. 4.

In 325, the user device 110 receives authentication information for the digital platform 150 from the user device 112 over the communication channel. For example, the user device 112 may transmit information to the user device 110 over the communication channel. The authentication information may include an indication of credentials such as a username and a password that may be used to access an account of the digital platform. In other embodiments, biometric data may be used instead of or in addition to a username and password. However, the exemplary embodiments are not limited to authentication information being the types of credentials. For example, the authentication information may comprise a substitute for a username and password or other combination of credentials such as a substitute provided in the form of a token. The token can be stored on the user device 110 and periodically be provided to the digital platform to maintain access to a user account or content thereof, so long as the token remains valid. Otherwise, if the token has expired or has exceeded any number of limits or conditions for its use and validity, a new token or other authentication information may be required for access to the digital platform by the user device. Throughout this description, reference to authentication information may represent any appropriate type of information associated with an account, user or device that is authorized to access the digital platform 150.

In 330, the user device 110 establishes a session with the digital platform 150 using the authentication information received from the user device 112. The session may be shared between the user device 110 and the user device 112. More details regarding sharing of a session between the user devices 110, 112 will be described in more detail below. Subsequently, the method 300 ends.

The method 300 provides a peer-to-peer networking approach that has two phases. A first phase relates to the communications that occur for a pairing phase (e.g., the UDP broadcast). A second phase relates to the communications that occur over the persistent communication channel. Thus, the signaling for the first phase may be performed in accordance with a first communication protocol and the signaling for the second phase may be performed in accordance with a second different communication protocol. As will be described below with regard to the signaling diagram 400, from a protocol stack perspective, the UDP broadcast and the TCP communications may be on top of other communication protocols.

In the example of the method 300, authentication information is provided by the user device 112 to the user device 110. This exchange allows the user device 110 (e.g., the connected TV) to login to the digital platform 150 based on a user-initiated action at the user device 112 (e.g., the mobile device). Thus, compared to conventional approaches, the exemplary embodiments provide an improved login experience that is low friction and allows users to quickly and easily access the content that they are subscribed to on the digital platform 150. However, as indicated above, the exchange of authentication information is not the only functionality that may be facilitated by the communication channel between the user devices 110, 112. Other example will be described in more detail below.

There are various ways in which the D2D communication channel between the user devices 110, 112 may improve the user experience associated with the digital platform 150. While the example provided in the method 300 describes a scenario in which the connected TV is not logged into the digital platform 150, the exemplary embodiments are not limited to this type of scenario. For instance, the authentication information for the digital platform 150 may already be saved on the connected TV. As a result, launching the user-facing application 235 on the connected TV may automatically access the digital platform 150 using authentication information saved locally at the connected TV. In this type of scenario, the method 300 may be used to establish a D2D communication channel between two user devices that are already logged into the digital platform 150. Accordingly, the method 300 may apply to establishing a communication channel between user devices under any appropriate set of circumstances.

FIG. 4 shows an exemplary signaling diagram 400 for establishing a communication channel between a first user device 110 and a second user device 112 using a computing platform agnostic peer-to-peer networking approach according to various exemplary embodiments. The signaling diagram 400 will be described with regard to the arrangement 100 of FIG. 1, the user device 110 of FIG. 2 and the method 300 of FIG. 3.

The signaling diagram 400 includes the user device 110, the user device 112 and the digital platform 150. Like the method 300, in this example, the user device 110 represents a connected TV and the user device 112 represents a mobile device. Each device is configured to access the digital platform 150 using a user-facing application.

In 405, the user device 110 launches the user-facing application 235 stored on the user device 110. This is substantially similar to 305 of the method 300.

In 410, the user device 110 performs an advertising procedure. The advertising procedure may include at least one of performing a broadcast and listening for a broadcast. Those skilled in the art will understand that the advertising procedure may include any of a variety of different operations related to broadcasting the device's pairing availability and listening for other device's pairing availability. In this example, during the advertising procedure 410, the connected TV at least listens for a broadcast from other user devices configured to access the digital platform 150 which is substantially similar to 310 of the method 300.

In 415, the user device 112 launches a user-facing application corresponding to the digital platform 150 stored on the user device 112. For example, a user-initiated action at the user device 112 (e.g., selection of an icon), may initiate the launch of the user-facing application at the mobile device.

In 420, the user device 112 performs an advertising procedure. As mentioned above, the advertising procedure may include various operations related to broadcasting the device's pairing availability and listening for other device's pairing availability. In this example, during the advertising procedure 420, the mobile device at least broadcasts a pairing message.

In 425, the user device 112 generates a public and private key pair. In this example, the public and private pair key are generated during the advertising procedure 420. However, those skilled in the art will understand that the public and private key pair may be generated at any appropriate time.

The public key may be passed to the user device 110 in the broadcast indicating the pairing availability of the user device 112 (e.g., in 430). Other messages transmitted by the user device 112 may be signed with the private key. The user device 110 may validate the messages from the user device 112 using the public key included in the broadcast indicating the pairing availability of the user device 112. The public and private key may be discarded upon terminating the connection between the user device 110 and the user device 112. If the user device 110 is connected to multiple user devices, a separate public and private key pair may be maintained for each connection. However, reference to the public and private key pair encryption technique is only for illustrative purposes. Those skilled in the art will understand that any suitable encryption technique may be utilized.

In 430, the user device 112 broadcasts a message indicating the pairing availability of the user device 112. This broadcast is part of the advertising procedure 420. For example, the mobile device may broadcast a signal indicating the desire of the mobile device to pair with another device. As mentioned in the method 300, the broadcast may be in accordance with the UDP protocol. This UDP broadcast may be transported on top of another communication protocol. For example, other protocols such as a short-range communication protocol (e.g., Bluetooth), a computing platform specific communication protocol, a WLAN (e.g., WiFi) protocol, over an audible signal, optical signal, infrared signal or any other appropriate over the air signaling mechanism. The UDP broadcast may enable the user device 110 and the user device 112 to identify each other for further communications.

To provide one example, consider the exemplary arrangement 100. Initially, the user device 110 and the user device 112 may be connected to the WLAN 101 via the same AP (e.g., the AP 120 or AP 121). The WLAN 101 may facilitate the exchange of the UDP broadcast. Once paired, the user device 110 and the user device 112 may communicate directly with one another while connected to the WLAN 101 or connected to different WLANs (not pictured). In this example, the user devices 110, 112 are connected to the same AP. However, as shown in FIG. 1, the user devices 110 may be connected to a WLAN 101 via different APs. This example is not intended to limit the exemplary embodiments in any way, an indication of the pairing availability may be provided in any appropriate manner and does not require the devices to be connected to the same AP or the same WLAN.

In other embodiments, the pairing may be done using a matrix barcode (e.g., a quick response (QR) code). For example, the connected TV or the mobile device may display a matrix barcode. The other device may read the matrix barcode to pair with one another. Once paired the communication channel may be established.

The message indicating the pairing availability of the user device 112 may be broadcast periodically. For example, for a first duration, the message may be broadcast periodically every x seconds in response to application launch. Subsequently, for a second duration, the message may be broadcast periodically every y seconds. In some embodiments, the broadcast of the pairing messages may stop when a communication channel is established with one or more devices.

In the signaling diagram 400, the advertising procedure 420 performed by the user device 112 is shown as ending after the pairing message is transmitted in 430 and the advertising procedure 410 performed by the user device 110 is shown as ending after the pairing message is received in 430. However, this is merely provided for illustrative purposes. A user device may perform the advertising procedure at any point after application launch even after a communication channel is established with another user device. For example, in some embodiments, a user device may continuously listen for pairing messages. In other embodiments, the user device may be configured to listen for pairing messages periodically in accordance with a schedule, a timer, user input or any other appropriate factor. Similarly, a user device may broadcast a pairing message at any point after application launch even after a communication channel is established with another user device. For example, in some embodiments, a pairing message may be broadcast periodically every x seconds, in response to user input, in accordance with a schedule, a timer or any other appropriate factor. Certain devices such as the mobile device may have a limited battery supply and thus, the operations performed for the advertising procedure on these types of devices may be limited to avoid a power drain. Other devices such as the connected TV have a wired power supply. Thus, the operations performed for the advertising procedure on these types of devices do not have to consider the power drain associated with the advertising procedure.

In 435, the user device 110 and the user device 112 may establish a communication channel based on the pairing message. For example, a TCP connection may be established based on the UDP broadcast. The TCP connection may then be leveraged for further signaling exchange between the user devices 110, 112. This TCP connection may be on top of another communication protocol. For example, other protocols such as a short-range communication protocol (e.g., Bluetooth), a computing platform specific communication protocol, a WLAN (e.g., WiFi) protocol, over an audible signal or any other appropriate over the air signaling mechanism.

To determine the other communication protocol, the user device 110 may be configured to identify a set of available communication protocols. This determination may be made based on any of a variety of different factors, including but not limited to, the type of user devices, information included in the UDP broadcast, information included in another message from the user device 112, information received from the digital platform 150, information stored on the user device 110, whether microphone access is granted, etc. The user device 110 may then rank the available communication protocols based on any appropriate set of one or more factors. The user device 110 may then select one of the communication protocols based at least, in part, on the rank assigned to the communication protocol. Other factors such as, but not limited to, the type of data to be exchanged over the communication channel, measurement data, user preference, a machine learning model trained based on operations performed by the user device 110, a machine learning model trained based on operations performed by other devices, etc.

In 440, the user device 112 generates a public and private key pair. As mentioned above reference to public and private key pair encryption is merely provided for illustrative purposes. Those skilled in the art will understand that any appropriate type of encryption techniques may be utilized.

In 445, the user device 110 may transmit an acknowledgement message to the user device 112 over the TCP connection. The acknowledgement may indicate to the user device 110 that the pairing availability broadcast was received by the user device 110. Further, this message may include the public key generated by the user device 110 so that it may be utilized by the user device 112 to validate subsequent messages. As mentioned above, the TCP connection may be on top of another communication protocol selected in 430.

Messages exchanged between user devices 110, 112 over the TCP connection may include any of variety of different types of information. The types of information may include, but are not limited to, a signature signed with a private key associated with a public key, an indication of the type of message being sent, a message ID that uniquely identifies each message, a peer ID that uniquely identifies the source of the message, an user-facing application ID associated with the digital platform 150, a device name that identifies the device transmitting the message, context information, payload data, etc.

In 450, the user device 110 may transmit a login request to the user device 112. The login request may indicate to the user device 112 that the user device 110 is requesting authentication information for the digital platform 150.

In 455, user-initiated action at the user device 112 may accept or decline the request. If the user-initiated action indicates that the user has accepted the request to share its authentication information, the mobile device 112 may transmit an accept message to the user device 110 including the authentication information. If the user-initiated action indicates that the user has rejected the request to share its authentication information, the mobile device 112 may transmit a message to the user device 110 indicating that the request has been rejected. In this example, the user-initiated action indicates that the request has been accepted.

The user-initiated action in 455 may be the only other user-initiated action other than launching the user-facing application on the user devices 110 and the user-facing application on the user device 112. Thus, the exemplary embodiments facilitate a low friction login experience. To further reduce the number of user-initiated actions, the user device 112 may be triggered to broadcast the UDP pairing message when the user device 112 is within proximity of the user device 110. For example, the user device 110 may periodically broadcast beacons that are triggered to wake up the user devices configured with a user-facing application corresponding to the digital platform 150. When the user device 112 receives the beacon, the user device 112 may launch the user-facing application corresponding to the digital platform 150 which may trigger the UDP broadcast.

In 460, the user device 112 transmits a message to the user device 110 that the request has been accepted. The message may include authentication information that may be used by the user device 110 to access the digital platform 150.

In 465, the user device 110 performs a login procedure with the digital platform 150 using the authentication information received from the user device 112. In 470, the user device 110 transmits a message indicating the result of the login procedure. If the login procedure is successful, the message may indicate that the authentication information passed from the user device 112 successfully authenticated the user device 110. If the login procedure is not successful, the message may indicate that there was an error when trying to authenticate the user device 110 using the authentication information received from the user device 112. In this example, the login procedure was successful.

As mentioned above with regard to FIG. 3, in one aspect, the computing platform agnostic peer-to-peer networking approach may enable an improved login experience. In some embodiments, the communication channel may be released after a successful login. In other embodiments, the communication channel may be maintained so that is may be utilized for various different types of functionality related to improving the user experience associated with the digital platform 150. The determination to release or maintain the communication channel may be made on any appropriate basis.

In some embodiments, to maintain the communication channel, the connected user devices may exchange ping and pong messages. For example, one or more of the user devices may be configured to transmit a ping message to the other endpoint. If a pong is not received in response to the ping within a predetermined duration, the device that transmitted the ping may assume the target device is no longer available and a timeout may be declared. The communication channel may then be released. However, reference to ping and pong messages are merely as an example of how the communication channel may be maintained. Other techniques such as keep alive messages or any other appropriate signaling may be used to maintain the D2D communication channel.

The method 300 and the signaling diagram 400 were both described with regard to a connected TV and a mobile device. However, as mentioned above, the exemplary embodiments are not limited to these types of user devices. Any appropriate type of user devices may share an authentication information or a session with one another. The D2D communication channel may be used to provide various functionality that may improve the user experience associated with the digital platform 150. Various examples are described below. However, the exemplary computing platform agnostic peer-to-peer networking approach is not limited to any particular example. This exemplary approach may be used to establish a D2D communication channel that may be used to enable any appropriate type of functionality.

In one exemplary example, the communication channel may enable a subscriber to grant guest access to the digital platform to a non-subscriber. For example, within the context of the signaling diagram 400, the user device 110 may belong to a non-subscriber and the user device 112 may belong to a subscriber. On the digital platform side, guest access may be managed such that the interactions between the connected TV and the digital platform 150 do not affect the subscriber's account (e.g., preferences, recommendations, etc.). For example, the digital platform 150 may identify that guest access has been granted to a non-subscriber's device. The digital platform 150 may generate and maintain a profile or account associated with the non-subscriber.

The duration of the guest access may be based on any of a variety of different factors. In some embodiments, the duration of the guest access is based on time (e.g., 10 minutes, 30 minutes, 1 hour, 3 hours, 1 day, 3 days, a week, a month, etc.) In other embodiments, the duration of the guest access is based on the duration of the session (e.g.

guest access granted during duration of selected event, TV episode(s), movie, etc.). Other factors that may determine the duration of guest access include, but are not limited to, the digital platform services selected during the session, a predetermined number of interactions or selections of content over one or more sessions (e.g. limit to five episodes, first season, two movies, one sporting event, etc.), ping/pong signaling, the location of the user device that is the source of the authentication information relative to the user device that received the authentication information, (e.g. user devices must be within a predefined distance of one another), the user devices currently connected networks, etc. Thus, in some embodiments guest access may include maintaining the communication channel between the subscriber's device and the non-subscriber's device. In other embodiments guest access may include releasing the communication channel between the subscriber's device and the non-subscriber's device. In such an embodiment, conditions/factors for the duration of guest access may be applied to the validity of a guest token that was transmitted from user device 112 to user device 110 while the communication channel was maintained. The token may be a one-time use toke or other limited-use token. For example, the limited-use token may be a guest access token comprising one or more conditions/factors of validity.

Granting guest access to another non-subscriber in this manner provides various benefits to the subscriber and the entity providing the digital platform 150. For example, this type of guest access does not require the subscriber to disclose their username/password to the non-subscriber. This may ensure that the subscribers account is unaffected by the other persons interactions with the digital platform 150 (e.g., preferences, recommendations, purchases, etc.). From the perspective of the digital platform 150, this type of guest access may not only prevent password sharing but may also provide an opportunity to convert a non-subscriber to a subscriber.

In another exemplary example, the communication channel may enable a second screen experience. For instance, consider a scenario in which the D2D communication channel is between a connected TV and a mobile device. The digital platform 150 may provide multimedia data to the connected TV that is to be used to display streaming video. The digital platform 150 may also provide multimedia data to the connected TV that is to be used to display content on the mobile device. This multimedia data is relayed from the connected TV to the mobile device over the D2D communication channel. For example, within the context of sports-based content, the connected TV may be configured to display streaming video of a sporting event and the paired mobile device may be configured to display statistics associated with the sporting event. Within the context of streaming a movie or television show, the connected TV may be configured to display the streaming video and the other paired user device may be configured to display context information corresponding to the streaming video (e.g., director, actors, trivia, etc.).

The second screen experience may also interact with the digital platform 150 using the mobile device. For example, during the presentation of streaming video on the connected TV, the digital platform 150 may indicate to the user (on either the display of the connected TV or the mobile device) that goods, services or additional content may be purchased from the digital platform 150 or a third-party. To perform the transaction, user input may be entered at the mobile device. The mobile device may then transmit data corresponding to the user input over the D2D communication channel to the connected TV. The connected TV may the relay this data to the digital platform 150. Other exemplary second screen experiences may include, but are not limited to, interactive movies or any other type of video content, the option to play a deleted scene during the presentation of a movie or show, fantasy sports information, etc.

The above examples of types of second screen experiences are not intended to limit the exemplary embodiments in any way. Instead, the above examples are merely provided to demonstrate that a second screen experience may be enabled by one of the user devices relaying data received from the digital platform 150 to the other user device and relaying data received from the other user device to the digital platform 150. The D2D communication channel established using the computing platform agnostic peer-to-peer networking approach may facilitate any appropriate type of second screen experience.

In another exemplary example, the user devices may use the communication channel to synchronize displays such that streaming content on each of the displays are aligned in time. For example, the connected TV may establish a communication channel with one or more further connected TVs. The connected TV may be configured to display the same content. To ensure that the content is aligned in time, the connected TV may exchange information with the one or more further connected TVs to synchronize the displays of the connected TVs.

In a further exemplary example, the digital platform 150 may identify that a first user device currently sharing a session with a second user device has previously shared a session with a third different user device. The digital platform 150 may resume content previously played on the third user device at the second user device. Thus, the subscriber may move from location to location (e.g., room to room in their house) and resume previously played content with minimal user input.

In some embodiments, the digital platform 150 may encompass various distinct services. For example, the digital platform 150 may include a sports-based streaming service and news service and a movie and television content based streaming service. The digital platform 150 may provide a user-facing application corresponding to each service. A subscriber's account may be associated with both services. In some embodiments, the user may login to a user-facing application corresponding to one service on a first user device by opening a user-facing application corresponding to a different service on a second user device.

For instance, consider the examples described above with regard to the method 300 and the signaling diagram 400. To access the sports-based streaming service on the connected TV, the user may open the user-facing application corresponding to the movie and television content based streaming service on their mobile device. When the user opens the user-facing application corresponding to the movie and television content based streaming service, the mobile device may broadcast the pairing message. Subsequently, information may be exchanged between the connected TV and the mobile device over the communication channel. Since the same authentication information may be used to access both services or the user's account is associated with both services, the digital platform 150 may allow the user to login to the user-facing application on the connected TV based on the information received from the user-facing application on the mobile device despite the two user-facing applications corresponding to different services.

Scenarios may occur where there are multiple user devices deployed within the same vicinity. For example, in a dorm or hotel, there may be a set of one or more mobile devices and a connected TV in each room. To ensure that the user connects their mobile device to the connected TV in the same room, various techniques may be utilized.

A first technique may use beacon triangulation. This technique may include placing multiple beacons around the room. Beacon triangulation may determine which room the user is in and thus, which connected TV the user wants to provide authentication information. A second technique also uses beacon triangulation. In this technique instead of placing beacons around the room, the connected TVs within the vicinity of the user may serve as the beacons. Beacon triangulation may determine which room the user is in and thus, which connected TV the user wants to provide authentication information. A third technique may use visual confirmation. For example, the connected TV can display a visual indication (e.g., an image, a graphic, a numeric code, an alphanumeric code, a video, an animation, etc.) that may also be provided in the pairing request. Thus, the user may compare the visual indication displayed on the connected TV and the visual indication received by the mobile device to determine whether the connected TV in their room is sending the pairing request. Those skilled in the art will understand that while these techniques are described with regard this dorm/hotel scenario, the techniques described above may be used in any scenario to establish the D2D communication channel between user devices.

The above referenced examples were described within the context of connected TVs and mobile devices. However, as mentioned above, the exemplary embodiments are not limited to these types of user devices. Any appropriate type of user devices may share authentication information or a session with one another.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
at a first user device configured to remotely access a digital platform:
receiving a first signal broadcast by a second user device;
identifying two or more types of wireless communication protocols that are available to use for establishing a direct wireless communication channel between the first user device and the second user device without an intermediate device;
selecting one of the communication protocols at the first user device, for direct communication between the first and second user devices;
establishing a communication channel at the first user device with the second user device in accordance with the selected communication protocol;
receiving a message including authentication information, at the first user device directly from the second user device over the communication channel; and
establishing a session with the digital platform at the first user device based on the authentication information received directly from the second user device,
wherein the first user device corresponds to a first user who is not a subscriber to the digital platform and the second user device corresponds to a second user who is a subscriber to the digital platform, and
wherein after the establishing the session with the digital platform at the first user device, the first user device is permitted to access the digital platform using authentication information associated with the second user.

2. The method of claim 1, wherein the first signal is broadcast in accordance with user datagram protocol (UDP).

3. The method of claim 2, wherein the communication channel corresponds to both transport control protocol (TCP) and the selected communication protocol.

4. The method of claim 3, wherein the selected communication protocol is one of short-range communication protocol, a wireless local area network (WLAN) based protocol or a computing platform specific communication protocol.

5. The method of claim 1, wherein the first user device is granted access to the digital platform for a temporary duration, without subscribing to the digital platform, based on providing the authentication information corresponding to the second user device.

6. The method of claim 1, wherein the first user device is a connected television and the second user device is a mobile device.

7. A method, comprising:
at a first user device configured to remotely access a digital platform:
establishing a direct wireless communication channel with a second user device that is also configured to remotely access the digital platform using a second wireless communication protocol selected by the second user device from among two or more types of wireless communication protocols that are available to use for establishing the direct wireless communication channel between the first user device and the second user device without an intermediate device,
wherein establishing the direct communication channel includes a first message in accordance with a first communication protocol and a second message in accordance with the second communication protocol; and transmitting a message from the first user device to the second user device over the direct wireless communication channel, the message including authentication information, wherein the second user device is configured to establish a session with the digital platform based on the transmitted authentication information wherein the second user device corresponds to a second user who is not a subscriber to the digital platform and the first user device corresponds to a first user who is a subscriber to the digital platform, and wherein after the establishing the session with the digital platform at the second user device, the second user device is permitted to access the digital platform using authentication information associated with the first user.

8. The method of claim 7, wherein the first communication protocol is user datagram protocol (UDP) and the second communication protocol is transport control protocol (TCP).

9. The method of claim 7, wherein the message transmitted over the communication channel corresponds to both transport control protocol (TCP) and the second communication protocol selected by the second user device.

10. The method of claim 7, wherein establishing the communication channel is based on an advertising procedure.

11. The method of claim 7, further comprising:
receiving multimedia data from the second user device over the communication channel, wherein the second user device received the multimedia data from the digital platform.

12. The method of claim 7, further comprising:
receiving a request for the authentication information from the second user device;
receiving user input indicating the request is accepted; and
based on receiving the user input, transmitting the authentication information in the message to the second user device, wherein the second user device establishes the session with the digital platform based on the authentication information.

13. The method of claim 7, wherein the first user device is a mobile device and the second user device is one of a multimedia receiver or a set-top box.

14. A first user device, comprising:
a transceiver configured to communicate with a second user device; and
a processor configured to perform operations, the operations comprising:
identifying two or more types of wireless communication protocols that are available to use for establishing a direct wireless communication channel between the first user device and the second user device without an intermediate device;
selecting one of the communication protocols at the first user device, for direct communication between the first and second user devices;
establishing a communication channel at the first user device with the second user device in accordance with the selected communication protocol;
receiving a message including authentication information, at the first user device directly from the second user device over the communication channel; and
establishing a session with a digital platform at the first user device based on the authentication information received directly from the second user device,
wherein the first user device is granted access to the digital platform for a temporary duration, without subscribing to the digital platform, based on providing the authentication information corresponding to the second user device.

15. The first user device of claim 14, wherein the communication channel corresponds to both transport control protocol (TCP) and the selected communication protocol.

16. The first user device of claim 15, the operations further comprising:
receiving, prior to the identifying, a first signal broadcast by the second user device,
wherein the communication channel is established based on the first signal, and
wherein the first signal is broadcast in accordance with user datagram protocol (UDP).

17. The first user device of claim 14, wherein the selected communication protocol is one of short-range communication protocol, a wireless local area network (WLAN) based protocol or a computing platform specific communication protocol.

18. The first user device of claim 14, wherein the first user device corresponds to a first user who is not a subscriber to the digital platform and the second user device corresponds to a second user who is a subscriber to the digital platform, and wherein after the establishing the session with the digital platform at the first user device, the first user device is permitted to access the digital platform using authentication information associated with the second user.

* * * * *